US010467339B1

(12) United States Patent
Shen

(10) Patent No.: US 10,467,339 B1
(45) Date of Patent: Nov. 5, 2019

(54) USING MACHINE LEARNING AND NATURAL LANGUAGE PROCESSING TO REPLACE GENDER BIASED WORDS WITHIN FREE-FORM TEXT

(71) Applicant: SAP SE, Walldorf (DE)

(72) Inventor: Weiwei Shen, Santa Clara, CA (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/022,408

(22) Filed: Jun. 28, 2018

(51) Int. Cl.
*G06F 17/27* (2006.01)
*G06F 3/0484* (2013.01)
*G06F 3/0481* (2013.01)

(52) U.S. Cl.
CPC ........ *G06F 17/2735* (2013.01); *G06F 17/274* (2013.01); *G06F 17/2705* (2013.01); *G06F 17/2795* (2013.01); *G06F 3/0481* (2013.01); *G06F 3/0484* (2013.01)

(58) Field of Classification Search
CPC ............. G06F 17/2735; G06F 17/2705; G06F 17/274; G06F 3/0481
USPC ........................................ 704/9, 246; 706/20
See application file for complete search history.

(56) References Cited

U.S. PATENT DOCUMENTS

| 6,122,615 | A * | 9/2000 | Yamamoto | G10L 17/00 704/243 |
| 6,640,207 | B2 * | 10/2003 | Witschel | G10L 15/197 704/257 |
| 8,229,733 | B2 * | 7/2012 | Harney | G06F 17/271 704/10 |
| 8,965,764 | B2 * | 2/2015 | Ryu | G10L 17/00 704/246 |
| 2007/0150426 | A1 * | 6/2007 | Asher | G06K 9/6272 706/20 |
| 2008/0097748 | A1 * | 4/2008 | Haley | G06F 17/2785 704/9 |
| 2010/0268538 | A1 * | 10/2010 | Ryu | G10L 17/00 704/250 |
| 2013/0138641 | A1 * | 5/2013 | Korolev | G06F 17/2785 707/730 |
| 2015/0134325 | A1 * | 5/2015 | Skiba | G06F 17/2785 704/9 |
| 2016/0055457 | A1 * | 2/2016 | Mather | G06Q 10/1053 705/321 |
| 2017/0249017 | A1 * | 8/2017 | Ryu | G06F 17/276 |

* cited by examiner

*Primary Examiner* — Akwasi M Sarpong
(74) *Attorney, Agent, or Firm* — Jones Day

(57) ABSTRACT

A classification engine classifies words into gender-biased or neutral classes and outputs classification labels and probabilities the words were correctly classified. A dictionary engine generates a set of gender-biased words based on their labels, if their probability exceeds a threshold, if they are defined within a set of definitions. For each such word, the dictionary engine parses the set of definitions to extract the most frequent meaning of that word in a part of speech; parses the set of definitions to extract a synonym for the most frequent meaning of that word in that part of speech; and parses the classification engine output to determine that synonym's classification label. A synonym is selected that is labeled in the neutral class as a replacement for the gender-biased word. A dictionary entry is generated that includes the word, the part of speech, and the synonym.

20 Claims, 7 Drawing Sheets

```
<?xml version="1.0"?>
<!DOCTYPE corpus SYSTEM "all-words.dtd">
<corpus lang="en">

<text id="d000">
That
<head id="d000.s000.t001">'s</head>
what
the
<head id="d000.s000.t004">man</head>
had
<head id="d000.s000.t006">said</head>
*T*-1
.
Haney
<head id="d000.s001.t001">peered</head>
doubtfully
at
his
<head id="d000.s001.t005">drinking</head>
<head id="d000.s001.t006">companion</head>
through
<head id="d000.s001.t008">bleary</head>
,
<head id="d000.s001.t010">tear-filled</head>
<head id="d000.s001.t011">eyes</head>
.
He
<head id="d000.s002.t001">had</head>
no
<head id="d000.s002.t003">ready</head>
<head id="d000.s002.t004">answer</head>
,
as
<head id="d000.s002.t007">much</head>
*ICH*-1
from
<head id="d000.s002.t010">surprise</head>
as
from
the
<head id="d000.s002.t014">fit</head>
of
<head id="d000.s002.t016">coughing</head>
.
<head id="d000.s003.t000">Was</head>
```

FIG. 6

USING MACHINE LEARNING AND NATURAL LANGUAGE PROCESSING TO REPLACE GENDER BIASED WORDS WITHIN FREE-FORM TEXT

TECHNICAL FIELD

The subject matter described herein relates to computational analysis of free-form text.

BACKGROUND

Some computational systems are configured so as to receive, store, and process free-form text entries from users, e.g., single sentence or multiple sentence entries that may not have a predefined structure. For example, certain computational systems for use in managing data relating to employment at a company can be configured so as to receive and store job descriptions that are entered by users, so as to post such job descriptions to a web site, e.g., a site that is internal to or external to the company, and optionally also to receive, store, and process data that job applicants may submit when applying for those jobs. Such job descriptions may not be computationally analyzed before being posted, other than perhaps being checked automatically for spelling and grammar.

SUMMARY

Use of machine learning and natural language processing to replace gender biased words within free-form text is provided herein.

Under one aspect, a method for building a dictionary of replacement words for gender-biased words is provided. The method can include respectively classifying, by a classification engine of the computer system incorporating a machine learning model, words of a corpus into a male-biased class, a female-biased class, or a neutral class. The classification engine can output each classified word, a label indicating the class into which the word is classified, and a probability that the word was correctly classified. The method also can include generating, by a dictionary engine of the computer system, a set of gender-biased words by selecting words that are labeled as being in the male-biased class or the female-biased class, for which the probability exceeds a first threshold, and that are defined within a set of definitions. The method also can include performing operations for each word of the set of gender-biased words, by the dictionary engine of the computer system. These operations can include parsing the set of definitions to extract the most frequent meaning of that word in a part of speech. These operations also can include parsing the set of definitions to extract a synonym for the extracted most frequent meaning of that word in that part of speech. These operations also can include parsing the output of the classification engine to determine the label indicating the class into which that synonym was labeled. These operations also can include selecting at least one synonym that is labeled as being in the neutral class as a replacement for the word of the set of gender-biased words. These operations also can include generating a dictionary entry comprising the word, the part of speech, and the selected at least one synonym for that word.

In some configurations, generating the set of gender-biased words optionally includes operations, for each selected word that is labeled as being in the male-biased class or the female-biased class and for which the probability exceeds a threshold. These operations can include determining whether the set of definitions includes a definition for that word; and based upon the set of definitions not including a definition for that word, excluding that word from the set of gender-biased words.

Additionally, or alternatively, in some configurations, the method optionally further includes, for each synonym that is labeled as being in the male-biased class or the female-biased class, parsing the output of the classification engine to determine the probability that the synonym was correctly classified. The method optionally further can include selecting at least one synonym that is labeled as being in the male-biased class or the female-biased class, based upon the probability that that synonym was correctly classified. Optionally, the at least one synonym that is labeled as being in the male-biased class or the female-biased class is selected based upon the probability being less than a second threshold. As a further option, the first and second thresholds can be different than one another. As another option, at least one synonym that is labeled as being in the male-biased class or the female-biased class is selected based upon the probability of that synonym being lower than the probability of another synonym.

Additionally, or alternatively, in some configurations, the method optionally further includes filtering out, by the dictionary engine of the computer system, any words from the set of gender-biased words that are stop words, include punctuations other than a dash, or include a number.

Additionally, or alternatively, in some configurations, the method optionally further includes deleting the dictionary entry based upon the part of speech being noun.

Additionally, or alternatively, in some configurations, the method optionally further includes receiving, in a first graphical user interface (GUI) forming part of an end-user layer of the computer system, first user input including free-form text. Optionally, the method further includes respectively classifying, by the classification engine of the computer system incorporating the machine learning model, words of the free-form text into the male-biased class, the female-biased class, or the neutral class. At least one of the words of the free-form text can be classified into the male-biased class or the female-biased class. Optionally, the method further includes displaying, in the first GUI, the replacement word for at least one of the words classified into the male-biased class or the female-biased class. Optionally, the method further includes receiving, in the first GUI, second user input revising the free-form text by selecting the displayed replacement word. Optionally, the method further includes posting, by the computer system, the revised free-form text to a web site for display in a second GUI forming part of the end-user layer of the computer system.

Under another aspect, a computer system is provided herein that includes at least one data processor; and memory storing instructions which, when executed by the at least one data processor, result in operations. These operations can include respectively classifying, by a classification engine of the computer system incorporating a machine learning model, words of a corpus into a male-biased class, a female-biased class, or a neutral class. The classification engine can output each classified word, a label indicating the class into which the word is classified, and a probability that the word was correctly classified. These operations further can include generating, by a dictionary engine of the computer system, a set of gender-biased words by selecting words that are labeled as being in the male-biased class or the female-biased class, for which the probability exceeds a first threshold, and that are defined within a set of definitions. These operations further can include additional operations, for each word of the filtered set of gender-biased words, by the dictionary engine of the computer system. These additional operations can include parsing the set of definitions to extract the most frequent meaning of that word in a part of speech. These additional operations can include parsing the set of definitions to extract a synonym for the extracted most frequent meaning of that word in that part of speech. These additional operations can include parsing the output of the classification engine to determine the label indicating the class into which that synonym was labeled. These additional operations can include selecting at least one synonym that is labeled as being in the neutral class as a replacement for the word of the filtered set of gender-biased words. These additional operations also can include outputting a dictionary entry including the word, the part of speech, and the selected at least one synonym for that word.

Optionally, in some configurations, generating the set of gender-biased words includes, for each selected word that is labeled as being in the male-biased class or the female-biased class and for which the probability exceeds a threshold, performing further operations. These further operations can include determining whether the set of definitions includes a definition for that word; and based upon the set of definitions not including a definition for that word, excluding that word from the set of gender-biased words.

Additionally, or alternatively, in some configurations, the memory optionally further stores instructions which, when executed by the at least one data processor, result in additional operations. These additional operations can include, for each synonym that is labeled as being in the male-biased class or the female-biased class, parsing the output of the classification engine to determine the probability that the synonym was correctly classified. These additional operations also can include selecting at least one synonym that is labeled as being in the male-biased class or the female-biased class, based upon the probability that that synonym was correctly classified. Optionally, the at least one synonym that is labeled as being in the male-biased class or the female-biased class is selected based upon the probability being less than a second threshold. As a further option, the first and second thresholds are different than one another. As a still further option, at least one synonym that is labeled as being in the male-biased class or the female-biased class is selected based upon the probability of that synonym being lower than the probability of another synonym.

Additionally, or alternatively, in some configurations the memory optionally further stores instructions which, when executed by the at least one data processor, result in operations including filtering out, by the dictionary engine of the computer system, any words from the set of gender-biased words that are stop words, include punctuations other than a dash, or include a number.

Additionally, or alternatively, in some configurations the memory optionally further stores instructions which, when executed by the at least one data processor, result in operations including deleting the dictionary entry based upon the part of speech being noun.

Additionally, or alternatively, in some configurations the memory optionally further stores instructions which, when executed by the at least one data processor, result in further operations. These further operations can include receiving, in a first graphical user interface (GUI) forming part of an end-user layer of the computer system, first user input including free-form text. These further operations also can include respectively classifying, by the classification engine of the computer system incorporating the machine learning model, words of the free-form text into the male-biased class, the female-biased class, or the neutral class. At least one of the words of the free-form text can be classified into the male-biased class or the female-biased class. These further operations also can include displaying, in the first GUI, the replacement word for at least one of the words classified into the male-biased class or the female-biased class. These further operations also can include receiving, in the first GUI, second user input revising the free-form text by selecting the displayed replacement word. These further operations also can include posting, by the computer system, the revised free-form text to a web site for display in a second GUI forming part of the end-user layer of the computer system.

Under still another aspect, provided herein is a non-transitory computer-readable medium storing instructions which, when executed by at least one data processor of a computer system, result in operations. These operations can include respectively classifying, by a classification engine of the computer system incorporating a machine learning model, words of a corpus into a male-biased class, a female-biased class, or a neutral class. The classification engine can output each classified word, a label indicating the class into which the word is classified, and a probability that the word was correctly classified. These operations further can include generating, by a dictionary engine of the computer system, a set of gender-biased words by selecting words that are labeled as being in the male-biased class or the female-biased class, for which the probability exceeds a first threshold, and that are defined within a set of definitions. These operations further can include additional operations, for each word of the filtered set of gender-biased words, by the dictionary engine of the computer system. The additional operations can include parsing the set of definitions to extract the most frequent meaning of that word in a part of speech. The additional operations can include parsing the set of definitions to extract a synonym for the extracted most frequent meaning of that word in that part of speech. The additional operations can include parsing the output of the classification engine to determine the label indicating the class into which that synonym was labeled. The additional operations can include selecting at least one synonym that is labeled as being in the neutral class as a replacement for the word of the filtered set of gender-biased words. The additional operations can include outputting a dictionary entry including the word, the part of speech, and the selected at least one synonym for that word.

Optionally, the computer-readable medium further stores instructions which, when executed by the at least one data processor, result in operations including: for each synonym that is labeled as being in the male-biased class or the female-biased class, parsing the output of the classification engine to determine the probability that the synonym was correctly classified; and selecting at least one synonym that is labeled as being in the male-biased class or the female-biased class, based upon the probability that that synonym was correctly classified.

Non-transitory computer program products (i.e., physically embodied computer program products) are also described that store instructions, which when executed by one or more data processors of one or more computing systems, cause at least one data processor to perform operations herein. Similarly, computer systems are also described that can include one or more data processors and memory coupled to the one or more data processors. The memory can temporarily or permanently store instructions that cause at least one processor to perform one or more of the operations described herein. In addition, process flows can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the present subject matter can provide for automatically building a dictionary of replacement words for gender-biased words based on natural language processing. Responsive to detection of a gender-biased word within free-form text, which can be based on machine learning techniques, one or more replacement words for the gender-biased word can be automatically provided to a user within a graphical user interface. A replacement word can be automatically inserted into the free-form text, as a replacement for the gender-biased word, responsive to a user selection of that replacement word. Such automatic processing can be integrated within a wide range of applications and types of free-form text.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 6 illustrates an exemplary scheme for indexing free-form text.

Like reference symbols in the various drawings indicate like elements.

DETAILED DESCRIPTION

The systems, computer-readable media, and methods provided herein can use machine learning and natural language processing to generate a dictionary of replacement words for gender-biased words (collectively, male-biased words and female-biased words) that may be used in free-form text entered by a user, e.g., via a graphical user interface (GUI). The dictionary of replacement words can be used to replace gender-biased words in the free-form text. For example, the GUI can flag gender-biased words in the free-form text and can display replacements for those words, which the user can select via the GUI so as to revise the free-form text. In examples in which the revised free-form text includes a job description, applicants to the job can be expected to be more gender balanced than they would have been for the original job description which included more gender-biased words. A more balanced pool of applicants can be expected ultimately to yield a hiring of a better candidate for that job.

Figure 1:
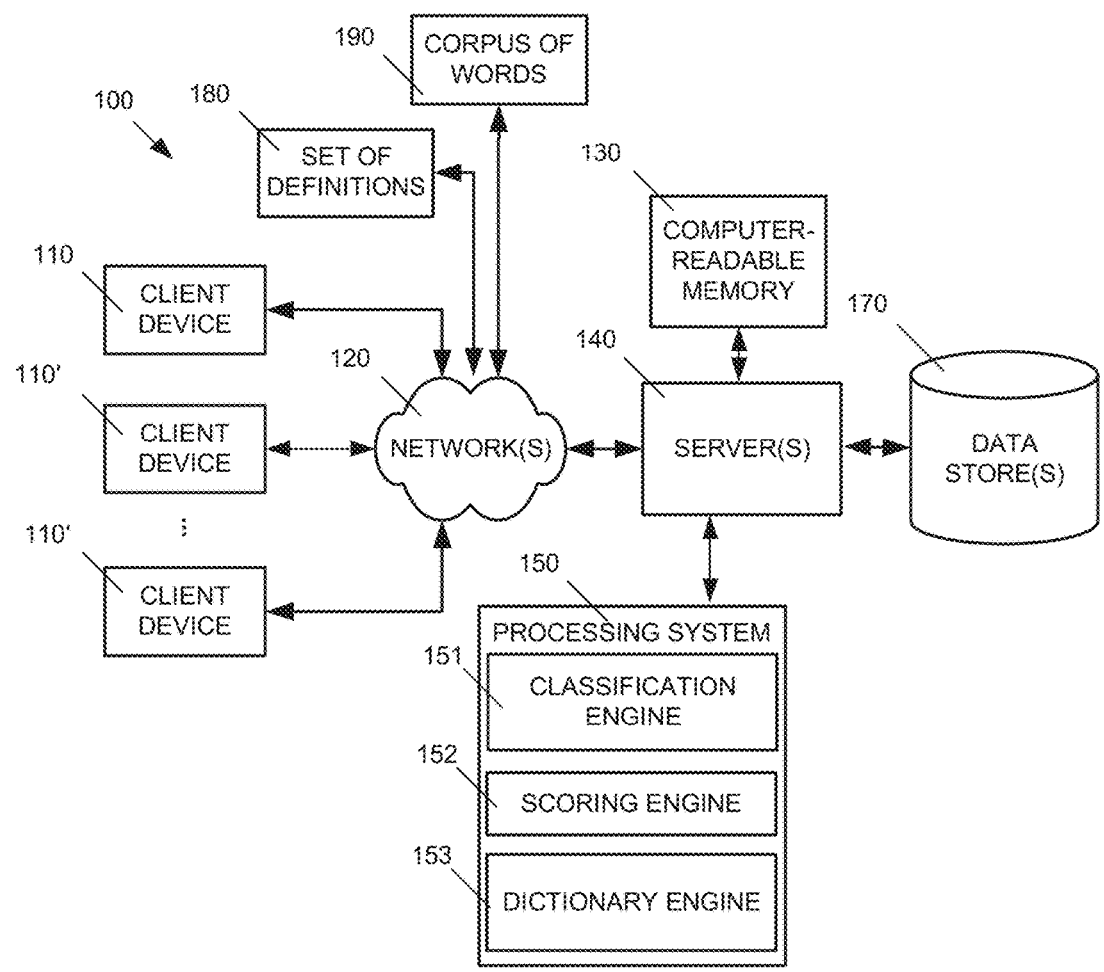
FIG. 1 is a system diagram illustrating an example computer system for use in connection with the current subject matter.

FIG. 1 is a system diagram illustrating an example computer system 100 for use in connection with the certain subject matter. System 100 can include at least one data processor, and memory storing instructions which, when executed by the at least one data processor, result in operations provided herein. In system 100, one or more client devices 110, 110' within an end-user layer of system 100 can be configured to access one or more servers 140 running one or more classification engines 151, scoring engines 152, and dictionary engines 153 on one or more processing systems 150 via one or more networks 120. Alternatively, one or more of client device 110 and server 140 can be the same computing device, eliminating the need for network 120. One or more servers 140 can access computer-readable memory 130 as well as one or more data stores 170. Optionally, a set of definitions 180 can be accessed by processing systems 150 via network 120, or alternatively the set of definitions can be stored in a data store 170, for use by dictionary engine 153 in generating a dictionary of replacement words for gender-biased words. Optionally, a corpus of words 190 can be accessed by processing systems 150 via network 120, or alternatively the corpus of words can be stored in a data store 170, for use by classification engine 151 in generating a dictionary of replacement words for gender-biased words.

In one exemplary configuration, one or more of client devices 110 corresponds to a recruiting node including a first GUI via which a user can enter free-form text into system 100, e.g., via which a recruiter for a company can enter a job description into system 100; one or more of client devices 110' corresponds to a job seeker node including a second GUI via which a user can search for jobs based on respective job descriptions, e.g., via a web site to which the job descriptions are posted, and optionally also apply for such jobs; and server(s) 140 correspond to a human resources hub coupled to recruiting node(s) 110 and to job seeker node(s) 110' and configured to flag and replace gender biased words within job descriptions entered within the first GUI at recruiting node(s) 110, to receive revised job postings within the first GUI responsive to the flagging and replacing, and to post the revised job postings within the second GUI at job seeker node(s) 110'. However, it should be appreciated that the present systems and methods suitably can be used to build dictionaries of replacement words for any type of free-form text, and are not limited to use with job descriptions.

In the illustrated exemplary configuration, recruiting node (s) 110 and job seeker node(s) 110' each can include, for example, a respective central processing unit and a computer-readable medium storing instructions for causing the respective central processing unit to perform one or more operations such as provided herein. For example, a computer-readable medium can store instructions causing the central processing unit of recruiting node(s) 110 to generate a GUI for receiving a job posting, for flagging gender-biased words within that job posting, for displaying replacement words for one or more of the flagged gender-biased words, and for receiving a revised job posting responsive to said flagging and said displaying. As another example, a computer-readable medium can store instructions causing the central processing unit of job seeker node(s) 110' to generate a GUI for posting, on a web site, the revised job posting.

Human resources hub 140 can be configured so as to receive job postings received by the GUIs of recruiting node(s) 110; to classify as gender-biased one or more words within such job postings; to transmit to recruiting node(s) 110 information for use in flagging gender-biased words within the GUIs of recruiting node(s) 110; transmit to recruiting node(s) 110 information for use in displaying replacement words for one or more flagged gender-biased words within the GUIs of recruiting node(s) 110; to receive user selections of such replacement words within the GUIs of recruiting node(s) 110; to receive revised job postings received by the GUIs of recruiting node(s) 110 responsive to the flagging; and to transmit the revised job postings to GUIs of job seeker node(s) 110'. For example, human resources hub 140 can be configured so as to provide job postings received from recruiting node(s) 110 to processing system 150 for processing by classification engine 151 in a manner such as described in greater detail herein. Optionally, processing system 150 can include scoring engine 152 configured to generate gender bias scores for job descriptions and/or for revised job descriptions for display within the GUIs of recruiting node(s) 110 in a manner such as described in greater detail herein, e.g., for use in revising or further revising the job descriptions. Additionally, processing system 150 can include dictionary engine 152 configured to generate dictionary entries of replacement words for gender-biased words and for providing suitable replacement words to the GUIs of recruiting node(s) 110 in a manner such as described in greater detail herein, e.g., for use in revising or further revising the job descriptions.

Illustratively, processing system 150 can include a central processing unit and a computer-readable medium storing instructions (e.g., classification engine 151, dictionary engine 153, and optional scoring engine 152) for causing the central processing unit to perform one or more operations such as provided herein, e.g., so as to generate dictionary entries for gender-biased words within the free-form text; respectively to classify words of the free-form text (or revised free-form text) into a male-biased class, a female-biased class, or a neutral class; optionally so as to generate a gender bias score for the free-form text (or revised free-form text); for training the classification engine 151 for use in classifying words of a corpus for use in generating the dictionary entries and/or for classifying the words of the free-form text; for labeling words of a corpus of words as male-biased, female-biased, or neutral for use in training the classification engine; and for providing data, such as replacement words, to recruiting node(s) 110 and job seeker node(s) 110' for use in respective GUIs thereof.

In some configurations, system 100 can include at least one data processor (e.g., processor(s) of processing system 150) and memory (e.g., non-transitory computer-readable media of processing system 150) storing instructions which, when executed by the at least one data processor, result in operations that result in generation of dictionary entries for replacement words for gender-biased words. Such instructions can cause classification engine 151 to classify words of a corpus into a male-biased class, a female-biased class, or a neutral class. Such instructions can cause classification engine 151 to output each classified word, a label indicating the class into which the word is classified, and a probability that the word was correctly classified. Further details of such classification and output are provided below with reference to operation 210 of FIG. 2. Such instructions further can cause dictionary engine 153 to generate a set of gender-biased words by selecting words that are labeled as being in the male-biased class or the female-biased class, for which the probability exceeds a first threshold, and that are defined within a set of definitions. Further details of such generation of a set of gender-biased words are provided below with reference to operation 220 of FIG. 2.

Such instructions further can cause dictionary engine 153, for each word of the filtered set of gender-biased words, to parse the set of definitions to extract the most frequent meaning of that word in a part of speech. Further details of such extraction of the most frequent meaning are provided below with reference to operation 230 of FIG. 2. Such instructions further can cause dictionary engine 153 to parse the set of definitions to extract a synonym for the extracted most frequent meaning of that word in that part of speech. Further details of such synonym extraction are provided below with reference to operation 240 of FIG. 2. Such instructions further can cause dictionary engine 153 to parse the output of the classification engine to determine the label indicating the class into which that synonym was labeled. Further details of such label determination are provided below with reference to operation 250 of FIG. 2. Such instructions further can cause dictionary engine 153 to select at least one synonym that is labeled as being in the neutral class as a replacement for the word of the filtered set of gender-biased words. Further details of such synonym selection are provided below with reference to operation 260 of FIG. 2. Such instructions further can cause dictionary engine 153 to generate a dictionary entry including the word, the part of speech, and the selected at least one synonym for that word. Further details of such dictionary entry generation are provided below with reference to operation 270 of FIG. 2.

Figure 2:
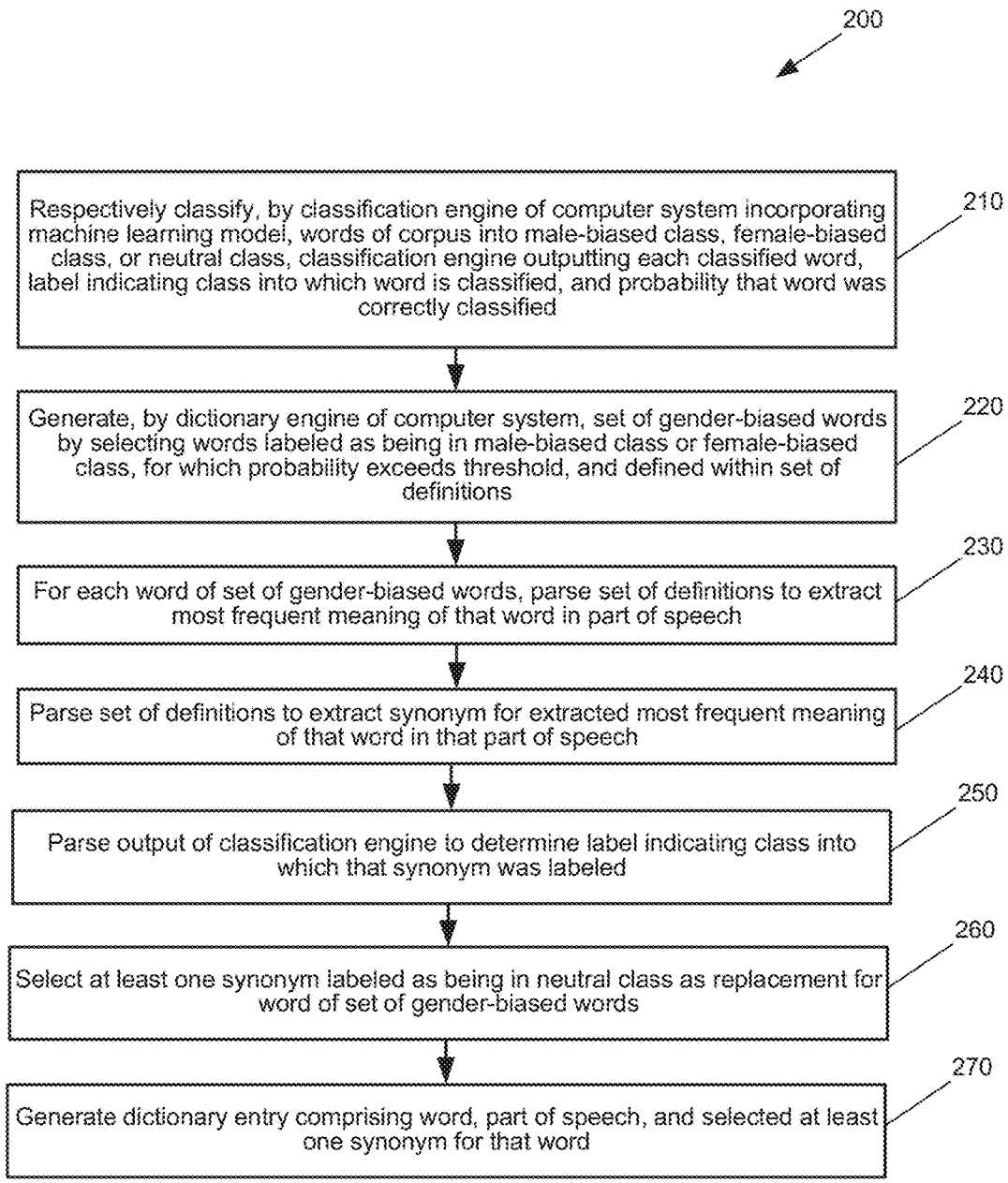
FIG. 2 is an example process flow diagram for building a dictionary of replacement words for gender-biased words.

FIG. 2 is an example process flow diagram for building a dictionary of replacement words for gender-biased words. Process flow 200 illustrated in FIG. 2 includes an operation of respectively classifying, by a classification engine of the computer system incorporating a machine learning model, words of a corpus into a male-biased class, a female-biased class, or a neutral class (210). The classification engine can output each classified word, a label indicating the class into which the word is classified, and a probability that the word was correctly classified.

For example, at operation 210 of method 200 illustrated in FIG. 2, classification engine 151 of the computer system incorporating a machine-learning model can classify words within the corpus of words 190, e.g., into a male-biased class, a female-biased class, or a neutral class. As one example, the corpus of words can be or include the Google-News corpus, available online at URL code.google.com/archive/p/word2vec/within the section "Pre-trained word and phrase vectors.". Classification engine 153 can access corpus of words 190 via network(s) 120, or the corpus of words can be stored in data store(s) 170. Classification engine 151 of the computer system can incorporate any suitable machine learning model, such as a support vector machine, random forest algorithm, or stochastic gradient descent classifier (logistic regression). The classification engine can be trained using a training set of words that respectively are labeled as male-biased, female-biased, or neutral. For example, Table 1 below illustrates an example of a partial training set of words that could be used to train the classification engine 151. Optionally, each word of the training set is provided to the classification engine as a word vector. The words of the training set can be labeled as male-biased, female-biased, or neutral in any suitable manner, and not all words necessarily need to be labeled as male-biased, female-biased, or neutral as in the same way as one another. In one example, words of the training set can be labeled as male-biased, female-biased, or neutral based upon usage of those words within job descriptions for which the genders of actual applicants to those jobs were known, based upon which biasing effects of words within those job descriptions can be inferred, in a manner such as described below with reference to operation 320 illustrated in FIG. 3. Classification engine 151 can provide as output an initial set of words, labels for those words indicating their respective classifications, and respective probabilities that the words have been correctly classified. As one purely illustrative example, for the word "boast," classification engine can output "boast, male, 0.92" indicating that this word was classified as male-biased with a 92% probability that this classification was correct. The output can have any suitable format, e.g., can be delimited in any suitable manner and the label and probability can be expressed in any suitable manner. For example, the labels need not expressly state "neutral," "male-biased," or "female-biased" so long as the classification engine 151 and dictionary engine 153 can determine the meaning of the label.

Process flow 200 illustrated in FIG. 2 also includes an operation of generating, by a dictionary engine of the computer system, a set of gender-biased words by selecting words that are labeled as being in the male-biased class or the female-biased class, for which the probability exceeds a first threshold, and that are defined within a set of definitions (220). As one nonlimiting example, dictionary engine 153 can filter the words of the initial set of words to exclude (remove) any words having a label of "neutral," and to exclude any remaining words—which would have labels of "male-biased" or "female-biased" after removal of "neutral" words—to exclude any words for which the probability of being correctly classified (labeled) is less than a threshold, e.g., is less than 50%, less than 75%, less than 90%, or less than 95%. In one nonlimiting example, the threshold is 90%. As a further option, dictionary engine 153 can exclude any words that are stopwords, include punctuations other than a dash, or include a number, e.g., using processing such as described below with reference to operation 320 illustrated in FIG. 3.

Additionally, dictionary engine 153 can check whether words of the initial set of words (e.g., following such filtering) are defined within set of definitions 180, which dictionary engine 153 can access via network(s) 120 or instead which can be stored within data store(s) 170. As one nonlimiting example, the set of definitions can be or include WordNet®, which is an online lexical database of English words, and can be accessed online at wordnet.princeton.edu. Dictionary engine 153 can send a query as to whether a word is defined within WordNet, or other suitable set of definitions, without necessarily requesting the definition itself; such a query can be computationally faster than requesting the definition, and can allow dictionary engine 153 to rapidly construct a set of gender-biased words that are defined and for which replacement words can be selected in a later step. In response to the query, set of definitions 180 can send to dictionary engine 153 an indication (such as "yes" or "no," "1" or "0," or other suitable indication) of whether the word has a definition. In response to the received indication, dictionary engine 153 can exclude, from the initial set of words, any words that lack definitions in the set of definitions 180 to form the set of gender-biased words for further use in constructing a dictionary of biased-words. Note that the various filtering and checking steps can be performed in a single step or in multiple steps in any suitable order.

Process flow 200 illustrated in FIG. 2 also includes an operation of, for each word of the set of gender-biased words, parsing, by the dictionary engine, the set of definitions to extract the most frequent meaning of that word in a part of speech (230). For example, after dictionary engine 153 generates the set of gender-biased words in operation 220, dictionary engine 153 can submit an additional query to the set of definitions 180 for the most frequent meaning (sometimes referred to as "sense") of that word. In response to that query, the set of definitions 180 can respond with the most frequent meaning of that word, and the part of speech of the word for that meaning. For example, the word 'scold' has two possible parts of speech; it can be a noun or a verb. When 'scold' is a noun, its most frequent meaning in WordNet is "someone (especially a women) who annoys people by constantly finding fault"; when 'scold' is a verb, its most frequent meaning in WordNet is "censure severely or angrily". In certain configurations provided herein, the most frequent meaning is extracted at operation 230 because it can be expected that most of the time, recruiters write job descriptions using words based upon their most frequent meaning.

Process flow 200 illustrated in FIG. 2 also includes an operation of parsing the set of definitions to extract a synonym for the extracted most frequent meaning of that word in that part of speech (240). For example, responsive to receiving the most frequent meaning of the word and the part of speech from set of definitions 180, dictionary engine 153 can submit an additional query to the set of definitions 180 for any synonym(s) of the most frequent meaning of that word in that part of speech. In response to that query, the set of definitions 180 can respond with one or more synonyms given the parts of speech. These synonyms provide a set of potential replacement words for each gender-biased word that is within the set of gender-biased words.

The set of potential replacement words then can be filtered by the dictionary engine 153 to remove words that may be sufficiently gender-biased. For example, process flow 200 illustrated in FIG. 2 also includes an operation of parsing the output of the classification engine 151 to determine the label indicating the class into which that synonym was labeled (250). For example, the output of operation 210 can include a large number of words, including words that are identified during operation 240 as being synonym(s) of the gender-biased words. The output of operation 210 therefore can be expected to include the synonyms, as well as labels for those synonyms (e.g., male-biased, female-biased, or neutral) and the probability that the synonym was correctly classified. Dictionary engine 153 can search the output for the synonym, and extract the synonym, its label, and its probability of correct classification.

A synonym that is classified as being in the neutral class can be selected as a suitable replacement word for a gender-biased word. For example, process flow 200 illustrated in FIG. 2 also includes an operation of selecting at least one synonym that is labeled as being in the neutral class as a replacement for the word of the set of gender-biased words (260). For example, dictionary engine 153 can filter the synonyms of each gender-biased word so as to exclude (at least initially) any synonyms that are classified as female-biased or male-biased.

Optionally, a synonym that is classified as being in the male-biased class or the female-biased class can be selected as a suitable replacement word for a gender-biased word if it meets one or more other suitable criteria. One such criterion the likelihood that the word labeled as male-biased or female-biased was classified correctly. In one nonlimiting example, dictionary engine 153 can, for each synonym that is labeled as being in the male-biased class or the female-biased class, parse the output of the classification engine to determine the probability that the synonym was correctly classified, and can select at least one synonym that is labeled as being in the male-biased class or the female-biased class, based upon the probability that that synonym was correctly classified. In some exemplary implementations, the probability of correct classification can be compared to a threshold which is used as a criterion for selecting that synonym as a replacement word. For example, the at least one synonym that is labeled as being in the male-biased class or the female-biased class can be selected as a replacement word based upon the probability being less than a threshold. This threshold can be the same as, or different than, the threshold used in operation 220. Exemplary values for this threshold can be the same as provided above for the threshold used in operation 220.

Before or after application of such a threshold, or without using such a threshold, at least one synonym that is labeled as being in the male-biased class or the female-biased class can be selected based upon the probability of that synonym being lower than the probability of another synonym. For example, for a synonym that is labeled as male-biased or female-biased, the synonyms can be sorted according to their probability of being correctly classified as being gender-biased. The synonym or synonyms with the lowest probabilit(ies) of being correctly classified as gender-biased can be selected as replacement words. As one nonlimiting example, dictionary engine 153 can determine via suitable queries to set of definitions 180 that "remonstrate" and "lecture" are both synonyms for "scold," which is classified as a female-biased word with the part of speech "verb." Dictionary engine 153 can determine by parsing the output of the classification engine that "remonstrate" is labeled as female-biased with probability of 0.65 (65%), and "lecture" is labeled as male-biased with probability of 0.7 (70%). By comparing the probability of "remonstrate" to the probability of "lecture," dictionary engine 153 can determine that "remonstrate" is less likely to be gender-biased than "lecture" and therefore select "remonstrate" as a synonym for "scold" (in addition to any neutral synonyms that may have been selected in operation 260.

Process flow 200 illustrated in FIG. 2 also includes an operation of generating a dictionary entry comprising the word, the part of speech, and the selected at least one synonym for that word (270). For example, dictionary engine 153 can generate a searchable entry, such as a database entry, within data store(s) 170, which includes the word, the part of speech, and a list of one or more synonyms stored in any suitable format. In one nonlimiting example, dictionary entries can be in the format (word, POS):[replacement-word(s)], such as exemplified by the following set of dictionary entries:

{(u'courtroom',u'n'):[u'court'],
(u'commonalities',u'n'):[u'commons'],
(u'caparisoned,u'v'):[ ],
. . . }

In this example, although the dictionary contains the word "caparisoned," dictionary engine 153 did not identify a replacement word for it. Note that each searchable entry generated at operation 170 can be considered to be or provide a dictionary entry, and the set of searchable entries can be considered to be or provide a dictionary of replacement words for gender-biased words. So as to computationally simplify use of the dictionary, in some implementations dictionary entries based upon the part of speech being noun can be deleted, for example because nouns may be expected to be less gender-biased than certain other parts of speech, such as verbs, adverbs, or adjectives. Additionally, or alternatively, dictionary entries that do not have replacement words (such as "caparisoned" above) can be deleted. Additionally, or alternatively, the set of dictionary entries can be manually edited so as to delete replacement words that a human would find obviously incorrect.

Such a dictionary (and entries therein) suitably can be used to provide replacement words for gender-biased words used in free-text. For example, classification engine 151 and dictionary engine 153 can assist a user in reducing gender-biased words in free-form text by identifying and flagging such biased words and indicating replacement words.

Figure 3:
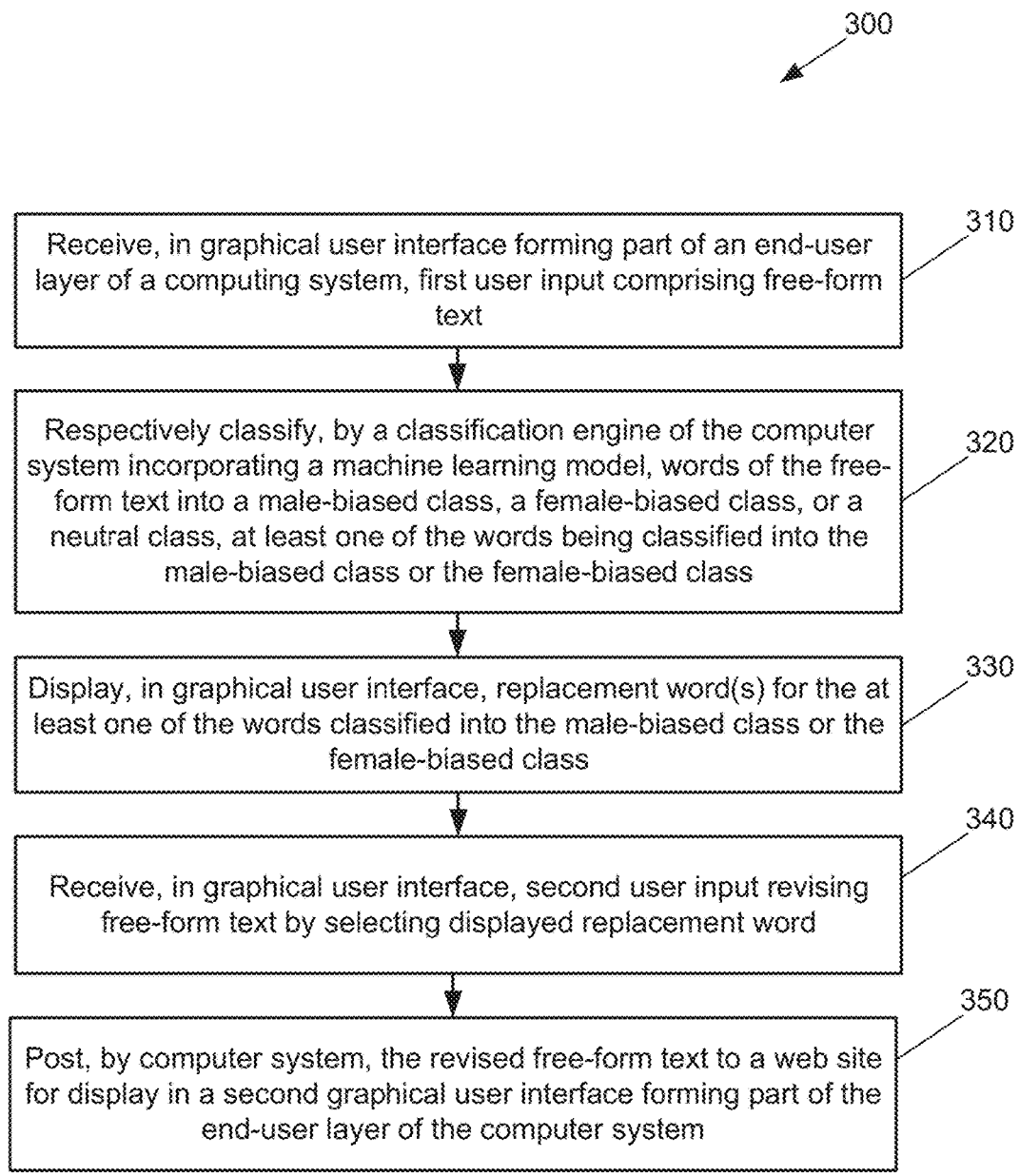
FIG. 3 is an example process flow diagram for flagging and replacing gender biased words within free-form text, such as job descriptions.

FIG. 3 is an example process flow diagram 300 for flagging and replacing gender biased words within free-form text, such as job descriptions. Process flow 300 includes an operation 310 of receiving, in a first graphical user interface forming part of an end-user layer of a computer system, first user input including free-form text. In one nonlimiting example, the free-form text can include a job description, but it should be appreciated that the present systems and methods can be applied using any other suitable text. For example, a GUI at client device 110 illustrated in system 100 of FIG. 1 can receive user input that includes free-form text. Optionally, the user input can include other data associated with the free-form text. Illustratively, where the free-form text includes a job description, such other data can include one or more of a requisition identification (ID) number associated with the job, a position number of the job, a job code for the job, an identification of one or more languages in which the job description is to be posted, a default language of the job description, an internal job title, an external job title, and a job start date. Illustratively, the job code can be or include an O*NET job code or other standard code. Such job codes can be grouped by family. For example, the O-NET-SOC taxonomy defines a set of occupations across the world of work. Based on the Standard Occupational Classification (SOC) from the U.S. Bureau of Labor Statistics, the O*NET-SOC taxonomy currently includes 974 occupations (corresponding to job codes) which are grouped into 23 major groups (corresponding to job families). In some configurations, the GUI of the client device 110 can receive the free-form text, and any other data that may be associated with the free-form text, via fillable or selectable elements in a web page displayed by the client device 110. Optionally, such web page can be hosted by server(s) 140. Client device 110 optionally can be configured so as to transmit the free-form text, and any other data that may be associated with the free-form text, to server(s) 140 via network(s) 120. Optionally, client device 110 locally stores this information, e.g., in a non-transitory computer-readable medium.

Process flow 300 illustrated in FIG. 3 further includes an operation 320 of respectively classifying, by a classification engine of the computer system incorporating a machine learning model, words of the free-form text into a male-biased class, a female-biased class, or a neutral class. In some configurations, at least one of the words is classified into the male-biased class or the female-biased class. For example, in system 100 illustrated in FIG. 1, server(s) 140 running classification engine 151 on processing system 150 can perform operation 320 on the free-form text received from client device 110. In another example, client device 110 can be configured so as to perform operation 320 on the free-form text, without the need to send the text to a separate processing system.

In some configurations, operation 320 can include preprocessing the free-form text, e.g., so as suitably to prepare the text for classification of certain words therein, e.g., by converting raw free-form text received by the GUI into a string of words. Illustratively, such preprocessing can include one or more of the following operations, and optionally can include all of the following operations. Such preprocessing operations can include text cleaning, e.g., parsing the free-form text so as to extract the text (e.g., words and punctuation) for further processing, which extraction can remove special characters, universal resource locators (URLs), and the like. Software resources for performing such text cleaning are publicly available, such as the Beautiful Soup software package for Python. Such preprocessing operations also or alternatively can include tokenization, e.g., dividing the text into a sequence of tokens that correspond to words in the text. Such tokenization can, for example, parse the text and divide the text into tokens based on the presence of whitespace (e.g., spaces) and/or punctuation. Software resources for performing such text cleaning are publicly available, such as the NLTK.word_tokenize software package for Python. Such preprocessing operations also or alternatively can include part of speech (POS) tagging, e.g., parsing the text and tagging words according to their respective parts of speech. POS tagging can attach a POS tag to each word, e.g., using "RB" for adverbs, "NN" for nouns, "VBP" for present tense verbs, and the like. Software resources for performing such POS tagging are publicly available, such as the NLTK.pos_tag software package for Python. Additionally, the tagged words can be parsed so as to extract only POS that can be expected to potentially have gender bias. For example, it can be expected that POS such as verbs, adjectives, and adverbs are more likely than other POS such as nouns or articles. As such, in some configurations, words that are tagged as a verb, adjective, or adverbs are extracted for further processing while words that are tagged as other parts of speech are not extracted. Note that the words tagged as other parts of speech suitably additionally or alternatively can be used.

In some configurations, the words of the free-form text can be indexed so as to facilitate identifying their context, POS, and later their replacement words. For example, FIG. 6 illustrates an exemplary scheme for indexing free-form text. In FIG. 6, the exemplary free-form text is "That's what the man had said. Haney peered doubtfully at his drinking companion through bleary tear-filled eyes. He had no ready answer, as much from surprise as from the fit of coughing. Was . . . " The index d* represents the index for the document. Because this is the first document (in this example), it has index d000 while a second document (not shown) would have index d001. The index s* represents the index of the sentence within the document, such that the first sentence beginning "That's what . . . " has the index s000, the second sentence beginning "Haney peered . . . " has the index s0001, and so on. The index t* represents the index of the word within the sentence, such that within the first sentence, the word "That's" has the index t000, the word "man" has the index t004, and so on. Thus, the indices d*.s*.t* uniquely identify the document, sentence, and location within that sentence of each word. The location of a word within the sentence, e.g., as indexed in a manner such as shown in FIG. 6, can be used to find the context of that word and therefore its POS. Given the word's indices, the sentence/context of the word can be identified by identifying all the neighboring words with the same document index and the same sentence index. Then using tokenization and part-of-speech tagging tools in python's Natural Language Toolkit (NLTK), the part of speech of the word in the sentence/context can be identified. The indices can be used in the processing when it is desired to output replacement words for biased words in job description. For example, given a job description, the biased words can be flagged in a manner such as described elsewhere herein or in U.S. patent application Ser. No. 15/801,982, entitled "Using Machine Learning to Flag Gender Biased Words Within Free-Form Text, Such as Job Descriptions" the entire contents of which are incorporated by reference herein. Before finding the right replacement words from the replacement word dictionary provided herein, (which can be in the format (biased word, POS)—(replacement words)), the POS of the flagged, biased word can be determined in the context of the job description. In order to identify the POS, the indexing can be used to find the context/sentence the biased word is in).

Such preprocessing operations also or alternatively can include converting words to lowercase, e.g., removing leading capital letters from words. Python includes instructions for such conversions, such as the ".lower( )" instruction. Such preprocessing operations also or alternatively can include lemmatizing verbs, e.g., identifying the "lemma," sometimes referred to as the canonical or citation form, of the verb (such as "prepare") and replacing a variant of the verb (such as "prepared") with its lemma. Software resources for performing such lemmatizing are publicly available, such as the NLTK.stem or NTLK WordNet software packages for Python. Such preprocessing operations also or alternatively can include parsing the text for alternatives indicated by "/", such as the alternatives "a/b" which may in some circumstances appear as a single token, and converting such alternatives to separate tokens for each alternative, such as "a" and "b." Such preprocessing also or alternatively can include parsing the text so as to remove stopwords (such as "a" or "the"), remove punctuation, and/or remove strings with punctuation or a digit within the string. Python includes regular expression operations for conducting such preprocessing.

Operation 320 illustrated in FIG. 3 can include classifying the preprocessed words of the free-form text, e.g., by classification engine 151 operated by processing system 150 illustrated in FIG. 1 and/or by client device 110. In some configurations, such classifying optionally can include comparing the preprocessed words to a set of words that were previously classified as being male-biased, female-biased, or neutral. Based upon a preprocessed word matching a word of the previously classified set, the preprocessed word can be classified in the class as that previously word, e.g., so as to avoid or reduce the need to perform complex machine learning based classification for such words, thus reducing the computational power needed to classify words of the free-form text. An example subset of previously classified (labeled) words is provided below in Table 1.

TABLE 1

Exemplary Previously Classified Words

| word | label |
| --- | --- |
| active | male |
| adventurous | male |
| aggressive | male |
| aggressively | male |
| ambitious | male |
| ambition | male |
| analyze | male |

TABLE 1-continued

Exemplary Previously Classified Words

| word | label |
| --- | --- |
| analysis | male |
| analytical | male |
| assertive | male |
| assertively | male |
| athletic | male |
| autonomous | male |
| autonomy | male |
| boast | male |
| boasts | male |
| challenges | male |

In operation 320 illustrated in FIG. 1, based upon a preprocessed word not matching a word of the previously classified set, the preprocessed word can be classified by inputting it to the machine-learning model of the classifier. The machine-learning model can be trained in a manner such as described below with reference to FIG. 4. The output of operation 320, whether the classification is based upon a match between the preprocessed word and a previously classified word, or is based upon input of the preprocessed word to the machine-learning model of the classifier, can include the word and data regarding the class into which the word is classified, e.g., a label indicating male-bias, female-bias, or neutral. For individual words, the classifier can output the respective probabilities of those words being male-biased, female-biased, or neutral. The words can be classified respectively with the label for which the probability is the highest. In one example, the classifier determines that the word "sensitive" has about a 10% probability of being male-biased, about a 90% probability of being female-biased, and about a 0% probability of being neutral. Based on these probabilities, the classifier therefore determines that the word "sensitive" has the highest probability of being female-biased, and labels the word as female-biased.

Referring again to FIG. 3, method 300 also can include operation 330 of displaying, in the first GUI, replacement word(s) for at least one of the words classified into the male-biased class or the female-biased class. For example, responsive to obtaining a word and its classification (whether such classification was performed at client device 110 or at processing system 150), the GUI of client device 110 can display one or more replacement words for that word, e.g., based upon the dictionary entry for that word that dictionary engine 153 generated using process flow 200. For example, the GUI of client device 110 can transmit the gender-biased word and its part of speech to dictionary engine 153 with a request for replacement words. An exemplary format of such a request is replaced_words_dict [(word,POS)], such as replaced_words_dict[('scold', 'verb')]. In response to such an exemplary request, dictionary engine 153 can respond with [u'jaw', u'trounce', u'remonstrate', u'lecture', u'reprove'].

Figure 5:
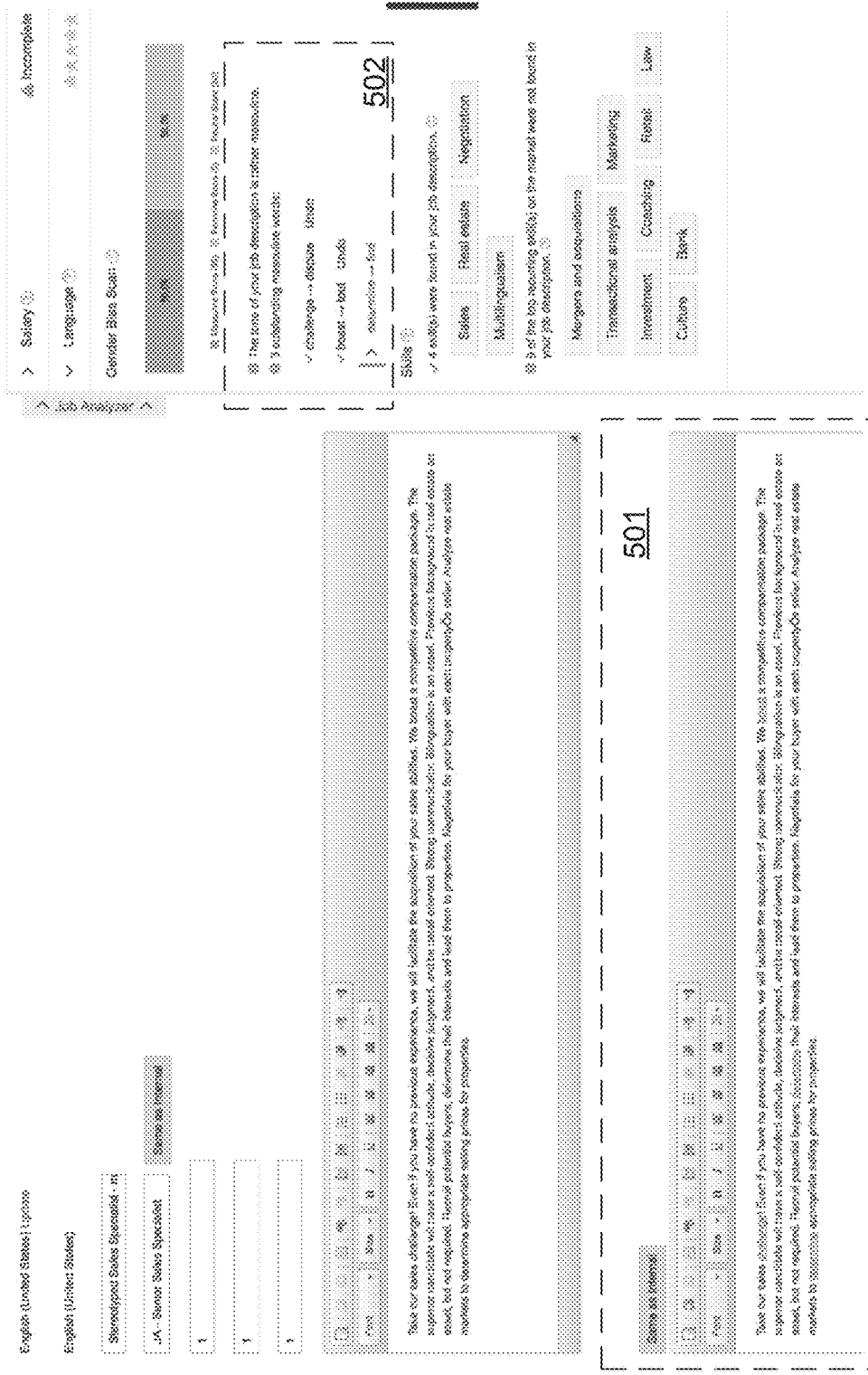
FIG. 5 is an example GUI illustrating flagging and replacement of gender biased words within a job description and display of a gender bias score for the job description.

In one nonlimiting configuration the replacement word(s) can be displayed in an area adjacent to the free-form text in a manner such as illustrated in FIG. 5. Additionally, the GUI of client device 110 optionally can flag that word. Flagging a word can include changing the appearance of the word, as it is displayed within the GUI, in such a manner as to visually distinguish the word from other displayed words that are not flagged, and optionally also so as to visually distinguish the word as being either male-biased or female-biased. Such flagging can include, for example, any suitable combination of one or more of highlighting the word (e.g., with different colors of highlighting used to indicate male-biased versus female-biased), changing the color of the word (e.g., with different word colors used to indicate male-biased versus female-biased), changing the emphasis of the word (e.g., with differently bolding, italicizing, and/or underlining the word to indicate male-biased versus female-biased), changing the font (e.g., with different typeface and/or size of the word to indicate male-biased versus female-biased), or any other suitable change or combination of changes to the appearance of the word in such a manner as to visually distinguish the word from other words that are not flagged and/or that are in a different one of male-biased or female-biased class. Additionally, or alternatively, such flagging can include displaying the word in an area of the graphical user interface that is separate from the free-form text in a manner such as illustrated in FIG. 5.

Illustratively, FIG. 5 is an example GUI illustrating flagging and replacement of gender biased words within a job description and display of a gender bias score for the job description, e.g., such as can be displayed by client device 110. In the non-limiting example shown in FIG. 5, a GUI displaying a job description is shown that includes forms for user input including one or more of requisition identification (ID) number associated with the job, a position number of the job, a job code for the job, an identification of one or more languages in which the job description is to be posted, a default language of the job description, an internal job title, an external job title, and a job start date, in addition to a form for receiving free-form text, e.g., a job description, within form 501. Optionally, respective forms can be provided for receiving free-form text for both an internal job description and an external job description (the external job description being designated 501 in FIG. 5. The exemplary GUI shown in FIG. 5 also includes an area 502 of the GUI that is separate from the free-form text, e.g., a column to the side (such as to the right or left) of area 501 that includes a list of words that were flagged as male-biased or female-biased during operation 320 and displays replacement words for such gender-biased words. In this example, the words "challenge," "boast," and "determine" each has been flagged as being male-biased (having masculine tone) and are listed as such in area 502 and also flagged within area 501 using color and underlining. Within area 502, a replacement word also is displayed for each flagged gender-biased word. In this example, the word "dispute" is displayed as a replacement word for "challenge," the word "tout" is displayed as a replacement word for "boast," and the word "find" is displayed as a replacement word for "determine."

Referring again to FIG. 3, method 300 also can include operation 340 of receiving, in the first GUI, second user input revising the free-form text by selecting the displayed replacement word. For example, the GUI can be configured such that the user can select the replacement word by clicking on it, which causes GUI to replace the gender-biased word in the free-form text with the selected replacement word. As another example, the GUI can accept any other user modifications, deletions, or replacement of gender-biased word(s) of the free-form text responsive to display of the replacement word(s), thus potentially reducing gender bias of the free-form text. In some configurations, the user can use his or her discretion in selecting an appropriate replacement word for use in the context of the free-form text. For example, the user can opt not to replace a gender-biased word with a displayed replacement word, e.g., can opt not to replace male-biased word "challenge" with displayed replacement word "dispute" which would be less appropriate in context than is "challenge." Nonetheless, the user may find value in the displayed replacement word and may opt to replace the gender-biased word with a different replacement, e.g., one which is not displayed. Optionally, operations 320 and 330 can be repeated on the revised free-form text so as to flag words of such revised text that are classified into the male-biased class or the female-biased class, thus facilitating further revision of the text.

Method 300 illustrated in FIG. 3 further can include operation 350 of posting, by the computer system, the revised free-form text to a web site for display in a second GUI forming part of the end-user layer of the computer system. For example, system 100 shown in FIG. 1 can post revised free-form text to a web site for display within a GUI of client device 110'. Such web site can be hosted by server(s) 140. As such, system 100 can provide an end-to-end control of receiving and revising free-form text, classifying and flagging gender-biased word(s) therein, posting that free-form text for consumption by users at a web site, and optionally receiving further user input based on the posting. In examples in which the revised free-form text is a job description, the web site can receive applications to the corresponding jobs for processing by server(s) 140. It can be expected that the pool of applicants to such jobs are more gender balanced than if the job descriptions had not been revised based on the flagging of gender-biased words therein.

Note that at operation 320 of method 300 illustrated in FIG. 3, classification engine 151 of the computer system incorporating a machine-learning model can classify words within the free-form text, e.g., into a male-biased class or a female-biased class. It should be appreciated that not all words necessarily fall into either of these two classes, e.g., not all words are gender-biased, and such non-gender biased words can be classified a neutral class. Classification engine 151 can incorporate any suitable machine learning model, such as a support vector machine, random forest algorithm, or stochastic gradient descent classifier (logistic regression). The classification engine can be trained using a set of words that respectively are labeled as male-biased, female-biased, or neutral. Optionally, each word of the set is provided to the classification engine as a word vector. Optionally, classification engine 151 that is implemented at operation 320 of FIG. 3 can be the same as classification engine 151 that is implemented at operation 210 of FIG. 2, or can be a different classification engine.

Figure 4:
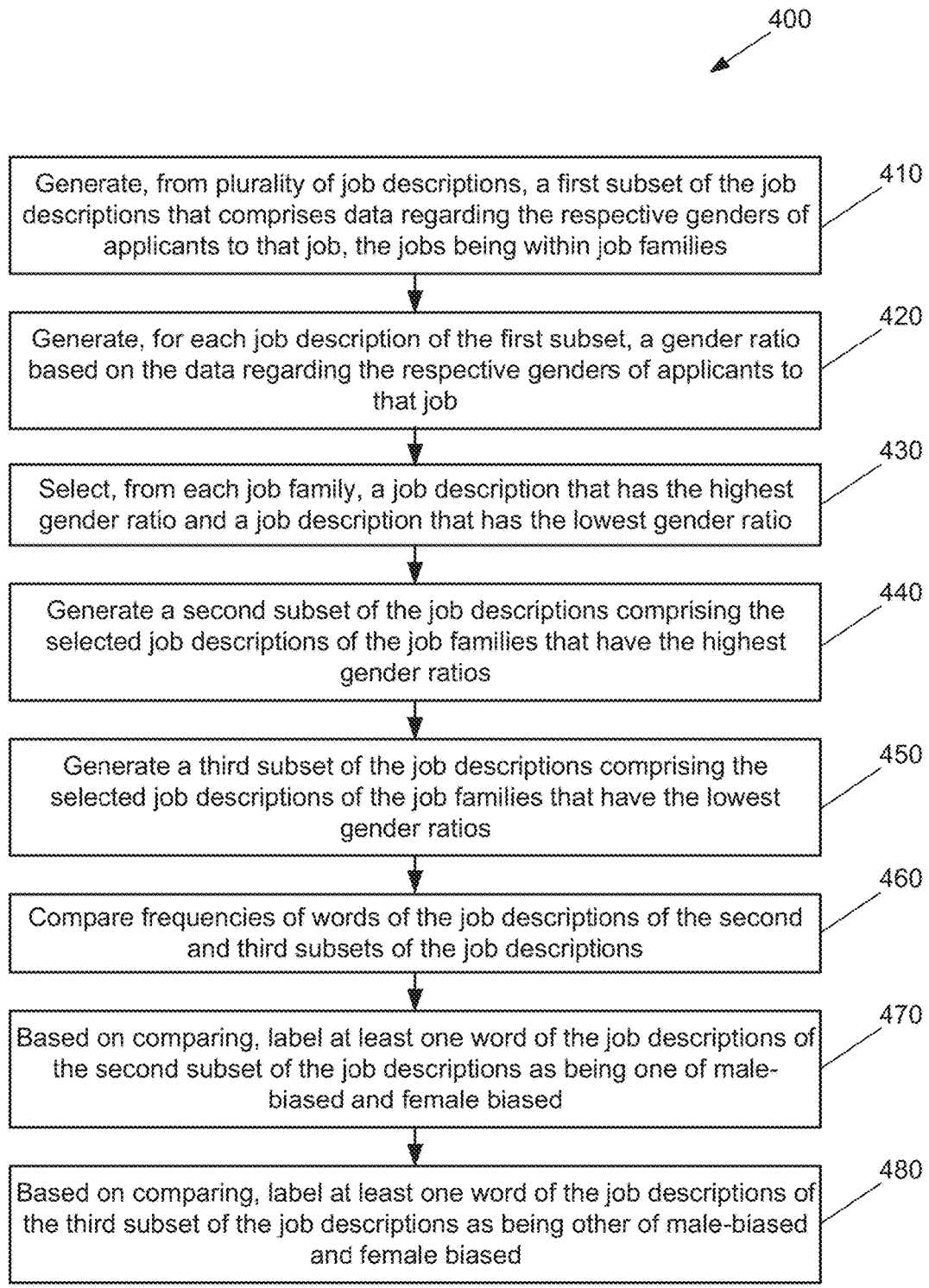
FIG. 4 is an example process flow diagram for labeling gender biased words for use in training a classification engine incorporating a machine learning model.

The words of the training set used at operation 320 can be labeled as male-biased, female-biased, or neutral in any suitable manner, and not all words necessarily need to be labeled as male-biased, female-biased, or neutral as in the same way as one another. In one example, words of the training set can be labeled as male-biased, female-biased, or neutral based upon usage of those words within job descriptions for which the genders of actual applicants to those jobs were known, based upon which biasing effects of words within those job descriptions can be inferred. For example, FIG. 4 is an example process flow diagram for labeling gender biased words for use in training a classification engine incorporating a machine learning model, e.g., a classification engine used in operation 320 and/or operation 210. Illustratively, the labeling of such words can include an operation generating, from a plurality of job descriptions, a first subset of the job descriptions that includes data regarding the respective genders of applicants to that job (operation 410 of method 400 illustrated in FIG. 4). For example, within system 100 illustrated in FIG. 1, classification engine 151 of processing system 150 can retrieve job descriptions from data store(s) 170 for jobs that respectively had been applied to by job applicants, e.g., via web sites posted for display by GUIs of client devices 110' and hosted by server(s) 140. Optionally, the jobs are within job families in a manner such as described herein. For at least some of such job descriptions, data store(s) 170 also can include the respective genders of the job applicants. For example, the GUIs of client devices 110' can include respective forms for receiving the gender of the job applicant, and such gender can be stored in data store(s) 170 and retrieved by processing system 150.

Based on the data regarding the respective genders of applicants to each job for which genders of job applicants are known, a gender ratio can be generated (operation 420 of method 400). For example, classification engine 151 of processing system 150 can generate a gender ratio for that job e.g., by dividing the number of male applicants to that job by the number of female applicants to that job, or vice versa. In addition to analyzing jobs for which genders of job applicants are known, classification engine 151 of processing system 150 optionally can be configured to limit its analysis to jobs meeting one or more other criteria, such as job descriptions that are in a particular language (such as English), that are for a particular region (such as the United States), or that include at least a threshold number of words (such as 250 words).

The labeling of words in the training set as male-biased, female-biased, or neutral also can include an operation selecting, from each job family, a job description that has the highest gender ratio and a job description that has the lowest gender ratio (operation 430 of method 400). For example, some jobs can attract a greater proportion of male applicants or a greater proportion of female applicants regardless of the particular language used in the job description. So as to reduce the effect of such job-related bias, as distinguished from job-description related bias, classification engine 151 of processing system 150 can group jobs by job families and can select the descriptions respectively having the most female-biased applicant pool and having the most male-biased applicant pool from within each job family. Because such job descriptions are for jobs within the same family as one another (and thus may have similar job-related biases as one another) it can be expected that biases within the applicant pool for those jobs arise from words used in the job descriptions.

The labeling of words in the training set as male-biased, female-biased, or neutral also can include an operation generating a second subset of the job descriptions that includes the selected job descriptions of the job families that have the highest gender ratios (operation 440 of method 400); and generating a third subset of the job descriptions that includes the selected job descriptions of the job families that have the lowest gender ratios (operation 450 of method 400). For example, classification engine 151 of processing system 150 can group the job descriptions with the most female-biased applicant pools together, and can group the job descriptions with the most male-biased applicant pools together.

The labeling of words in the training set as male-biased, female-biased, or neutral also can include an operation comparing frequencies of words of the job descriptions of the second and third subsets of the job descriptions (operation 460 of method 400). For example, certain words can occur more frequently among the job descriptions that have the highest gender ratios, and certain other words can occur more frequently among the job descriptions that have the lowest gender ratios. The labeling of words in the training set as male-biased, female-biased, or neutral also can include operations, based on the comparing, of labeling at least one word of the job descriptions of the second subset of the job descriptions as being one of male-biased and female-biased (operation 470 of method 400), and labeling at least one word of the job descriptions of the third set of the job descriptions as being the other of male-biased and female-biased. For example, if the second subset of job descriptions corresponds to jobs with the most female-biased applicant pools, classification engine 151 of processing system 150 can label one or more words of those job descriptions as being female-biased (operation 480 of method 400), e.g., based upon a relatively high frequency of those words within those job descriptions as compared to within the male-biased job descriptions. Or, for example, if the third subset of job descriptions corresponds to jobs with the most male-biased applicant pools, classification engine 151 of processing system 150 can label one or more words of those job descriptions as being male-biased, e.g., based upon a relatively high frequency of those words within those job descriptions as compared to within the female-biased job descriptions. Classification engine 151 of processing system 150 can label as neutral words that appear with similar frequencies as one another in both the female-biased and male-biased job descriptions. The particular format of the labeling can be suitably selected. Table 1 above provides one exemplary labeling format, and is not limiting.

Words of the training set also or alternatively can be labeled based on any other suitable criteria. For example, research previously has been published regarding the effect of wording differences within job advertisements upon applicant pools, and based upon which some words have been labeled as "masculine" or "feminine." Such words optionally can be included within the training set, for example together with words labeled using operations such as described with reference to FIG. 4. For exemplary words that can be included within the training set, see the following reference, the entire contents of which are incorporated by reference herein: Gaucher et al., "Evidence that Gendered Wording in Job Advertisements Exists and Sustains Gender Inequality," Journal of Personality and Social Psychology (Mar. 7, 2011): 1-20. Additionally, or alternatively, certain words such as stop words can be designated as neutral. Python's NLTK.corpus includes neutral stop words that can be included within the training set.

Referring again to FIG. 1, the classification engine 151 incorporating the machine learning model can be trained using the training set of labeled words (e.g., generated using operations such as described above) so as to extract features indicating male-bias, female-bias, or neutrality. In one example, the words of the training set are converted to word vectors that are input into the classification engine 151 together with the labels of the respective words. Word vectors for words are readily publicly available. Following such training, operation 320 illustrated in FIG. 3 can be implemented by classification engine 151. In one example, words of the free-form text can be preprocessed in a manner such as described with reference to operation 320, and converted to word vectors in a similar manner as described with reference to generation of the training set for input into classification engine 151.

It should be noted that operations such as described herein for generating a training set for gender biased words within job descriptions suitably can be modified for use in generating a training set for any other type of free-form text, and words within such type of free-form text suitably can be classified and flagged similarly as described herein. For example, the training set can be generated based on frequencies of words within any type of free-form text that suitably can be categorized as male-biased or female-biased; a classification engine trained based on such training set; and the trained classification engine then used to classify words within other free-form text of that type for flagging gender-biased words therein, based upon which the free-form text can be revised and posted to a web site for display in a GUI, e.g., as described elsewhere herein.

Additionally, as noted elsewhere herein, bias scores for free-form text can be generated and displayed in a GUI into which the free-form text is entered. For example, scoring engine 152 illustrated in FIG. 1 can be configured so as to generate a bias score for free-form text that is classified by classification engine 151, and such bias score can be displayed in a GUI of client device 110 into which the free-form text is entered. In one nonlimiting configuration, bias scores can be generated based on a hyperbolic tangent (tan h) function in which the score increases relatively quickly with the frequency of gender-biased words and gradually approaches an asymptote. The asymptote can be designed such that, for a given gender, based upon the number of words biased towards that gender reaching a threshold (e.g., 5%, 10%, 15%, 20%, or 25%) of the total number of words, then the tan h will approach 1. An example score for male bias MB of free-form text can be expressed as:

$$MB = \tan h(t \times m/2)$$

where w is the total number of words in the free-form text, m is the number of words in the free-form text classified as male-biased, and t is a multiplier selected such that the score approaches 1 when the number of biased words approaches the threshold. For example, for a threshold of 20%, a multiplier t=10 can be used; e.g., tan h(10*20/100)=0.964. An example score for female bias FB of free-form text can be expressed as:

$$FB = \tan h(t \times f/w)/2$$

where f is the number of words in the free-form text classified as female-biased. An example score for neutral words NW in the free-form text can be expressed as:

$$NW = 1 - MB - FB.$$

In one purely illustrative example, based upon a job description having 100 words with 9 words classified as male-biased and 8 words classified as female-biased and a threshold of 20%, MB can be expressed as:

$$MB = \tan h(10*9/100)/2 = 0.358(35.8\%)$$

and FB can be expressed as:

$$FB = \tan h(10*8/100)/2 = 0.332(33.2\%)$$

and the score for neutral words NW can be expressed as:

$$NW = 1 - 0.358 - 0.332 = 0.31(31\%).$$

In this example, note that because the free-form text includes a similar number of male-biased words as female-biased words, the gender bias of the text is relatively low. In one nonlimiting example, a score of female-bias can be generated by setting f equal to the number of words with a 90% or greater probability of being female biased, setting m equal to be the number of words with a 90% or greater probability of being male biased, and calculating MB, FB, and NW. These values can be graphically and/or numerically displayed in a graphical user interface, e.g., such as illustrated in FIG. 4.

Optionally, the bias score can be updated following revision of the free-form text (e.g., following operation 240 illustrated in FIG. 2). For example, method 200 illustrated in FIG. 2 further can include operations of respectively classifying, by the classification engine of the computer system, each word of the revised free-form text into the male-biased class, the female-biased class, or the neutral class, at least one of the words being classified into the male-biased class or the female-biased class; generating, by the scoring engine of the computer system, a revised gender bias score for the revised free-form text based on the classification of the words of the revised free-form text; and displaying, in the graphical user interface, the revised gender bias score.

Accordingly, among other things, the present systems, methods, and computer-readable media provide an end-user layer with a first GUI receiving free-form text and flagging gender-biased words of the free-form text for revision and a second GUI posting the revised free-form text, and a classification engine classifying words of the free-form text into gender-bias classes. Although the free-form text illustratively can include job descriptions, it should appreciate that any suitable type of free-form text can be processed in a manner such as provided herein.

One or more aspects or features of the subject matter described herein can be realized in digital electronic circuitry, integrated circuitry, specially designed application specific integrated circuits (ASICs), field programmable gate arrays (FPGAs), computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, can include machine instructions for a programmable processor, and/or can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, solid-state storage devices, memory, and Programmable Logic Devices (PLDs), used to provide machine instructions and/or data to a programmable data processor, including a machine-readable medium that receives machine instructions as a computer-readable signal. The term "computer-readable signal" refers to any signal used to provide machine instructions and/or data to a programmable data processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, such as for example as would a processor cache or other random access memory associated with one or more physical processor cores.

The computer components, software modules, functions, data stores and data structures described herein can be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality can be located on a single computer or distributed across multiple computers depending upon the situation at hand.

Figure 7:
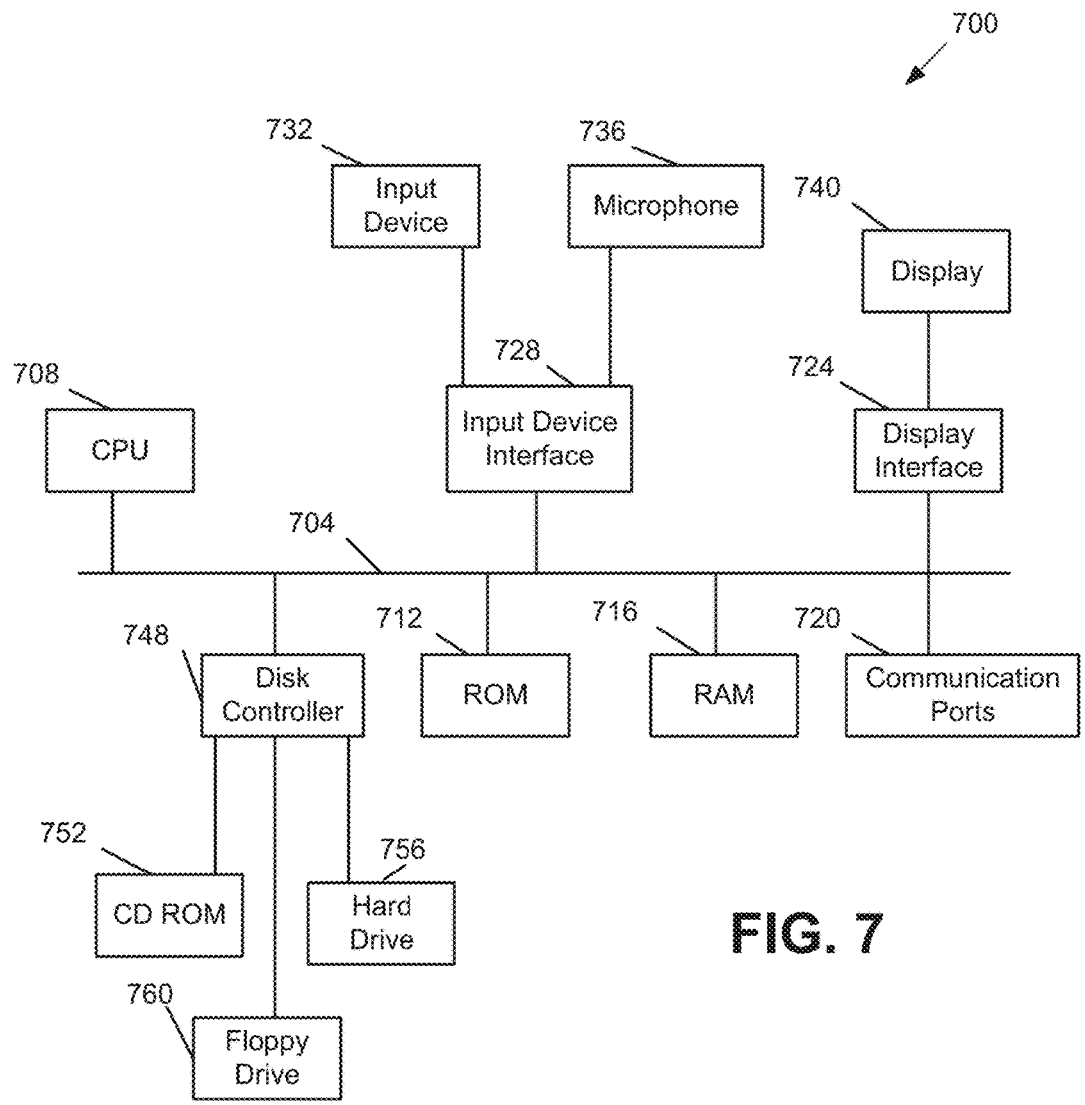
FIG. 7 is a diagram illustrating a sample computing device architecture for implementing various aspects described herein.

FIG. 7 is a diagram 700 illustrating a sample computing device architecture for implementing various aspects described herein, such as any aspect that can be processed using server(s) 140, client device(s) 110 or 110', or processing system 150 executing classification engine 151, scoring engine 152, or dictionary engine 153. A bus 704 can serve as the information highway interconnecting the other illustrated components of the hardware. A processing system 708 labeled CPU (central processing unit) (e.g., one or more computer processors/data processors at a given computer or at multiple computers), can perform calculations and logic operations required to execute a program. A non-transitory processor-readable storage medium, such as read only memory (ROM) 712 and random access memory (RAM or buffer) 716, can be in communication with the processing system 708 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 748 can interface one or more optional disk drives to the system bus 704. These disk drives can be external or internal floppy disk drives such as 760, external or internal CD-ROM, CD-R, CD-RW or DVD, or solid state drives such as 752, or external or internal hard drives 756. As indicated previously, these various disk drives 752, 756, 760 and disk controllers are optional devices. The system bus 704 can also include at least one communication port 720 to allow for communication with external devices either physically connected to the computing system or available externally through a wired or wireless network. In some cases, the communication port 720 includes or otherwise comprises a network interface.

To provide for interaction with a user, the subject matter described herein can be implemented on a computing device having a display device 740 (e.g., a CRT (cathode ray tube) or LCD (liquid crystal display) monitor) for displaying information obtained from the bus 704 to the user and an input device 732 such as keyboard and/or a pointing device (e.g., a mouse or a trackball) and/or a touchscreen by which the user can provide input to the computer. Other kinds of input devices 732 can be used to provide for interaction with a user as well; for example, feedback provided to the user can be any form of sensory feedback (e.g., visual feedback, auditory feedback by way of a microphone 736, or tactile feedback); and input from the user can be received in any form, including acoustic, speech, or tactile input. In the input device 732 and the microphone 736 can be coupled to and convey information via the bus 704 by way of an input device interface 728. Other computing devices, such as dedicated servers, can omit one or more of the display 740 and display interface 724, the input device 732, the microphone 736, and input device interface 728.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for building a dictionary of replacement words for gender-biased words, the method comprising:
   respectively classifying, by a classification engine of the computer system incorporating a machine learning model, words of a corpus into a male-biased class, a female-biased class, or a neutral class, the classification engine outputting each classified word, a label indicating the class into which the word is classified, and a probability that the word was correctly classified;
   generating, by a dictionary engine of the computer system, a set of gender-biased words by selecting words that are labeled as being in the male-biased class or the female-biased class, for which the probability exceeds a first threshold, and that are defined within a set of definitions;
   for each word of the set of gender-biased words, by the dictionary engine of the computer system:
      parsing the set of definitions to extract the most frequent meaning of that word in a part of speech;
      parsing the set of definitions to extract a synonym for the extracted most frequent meaning of that word in that part of speech;
      parsing the output of the classification engine to determine the label indicating the class into which that synonym was labeled;
      selecting at least one synonym that is labeled as being in the neutral class as a replacement for the word of the set of gender-biased words; and
      generating a dictionary entry comprising the word, the part of speech, and the selected at least one synonym for that word.

2. The method of claim 1, wherein generating the set of gender-biased words comprises, for each selected word that is labeled as being in the male-biased class or the female-biased class and for which the probability exceeds a threshold:
   determining whether the set of definitions comprises a definition for that word; and
   based upon the set of definitions not comprising a definition for that word, excluding that word from the set of gender-biased words.

3. The method of claim 1, further comprising:
   for each synonym that is labeled as being in the male-biased class or the female-biased class, parsing the output of the classification engine to determine the probability that the synonym was correctly classified; and
   selecting at least one synonym that is labeled as being in the male-biased class or the female-biased class, based upon the probability that that synonym was correctly classified.

4. The method of claim 3, wherein the at least one synonym that is labeled as being in the male-biased class or the female-biased class is selected based upon the probability being less than a second threshold.

5. The method of claim 4, wherein the first and second thresholds are different than one another.

6. The method of claim 3, wherein at least one synonym that is labeled as being in the male-biased class or the female-biased class is selected based upon the probability of that synonym being lower than the probability of another synonym.

7. The method of claim 1, further comprising filtering out, by the dictionary engine of the computer system, any words from the set of gender-biased words that are stop words, include punctuations other than a dash, or include a number.

8. The method of claim 1, further comprising deleting the dictionary entry based upon the part of speech being noun.

9. The method of claim 1, further comprising:
   receiving, in a first graphical user interface (GUI) forming part of an end-user layer of the computer system, first user input comprising free-form text;
   respectively classifying, by the classification engine of the computer system incorporating the machine learning model, words of the free-form text into the male-biased class, the female-biased class, or the neutral class, at least one of the words of the free-form text being classified into the male-biased class or the female-biased class;
   displaying, in the first GUI, the replacement word for at least one of the words classified into the male-biased class or the female-biased class;
   receiving, in the first GUI, second user input revising the free-form text by selecting the displayed replacement word; and
   posting, by the computer system, the revised free-form text to a web site for display in a second GUI forming part of the end-user layer of the computer system.

10. A computer system comprising:
   at least one data processor; and
   memory storing instructions which, when executed by the at least one data processor, result in operations comprising:
      respectively classifying, by a classification engine of the computer system incorporating a machine learning model, words of a corpus into a male-biased class, a female-biased class, or a neutral class, the classification engine outputting each classified word, a label indicating the class into which the word is classified, and a probability that the word was correctly classified;

generating, by a dictionary engine of the computer system, a set of gender-biased words by selecting words that are labeled as being in the male-biased class or the female-biased class, for which the probability exceeds a first threshold, and that are defined within a set of definitions;

for each word of the filtered set of gender-biased words, by the dictionary engine of the computer system:

parsing the set of definitions to extract the most frequent meaning of that word in a part of speech;

parsing the set of definitions to extract a synonym for the extracted most frequent meaning of that word in that part of speech;

parsing the output of the classification engine to determine the label indicating the class into which that synonym was labeled;

selecting at least one synonym that is labeled as being in the neutral class as a replacement for the word of the filtered set of gender-biased words; and outputting a dictionary entry comprising the word, the part of speech, and the selected at least one synonym for that word.

11. The computer system of claim 10, wherein generating the set of gender-biased words comprises, for each selected word that is labeled as being in the male-biased class or the female-biased class and for which the probability exceeds a threshold:

determining whether the set of definitions comprises a definition for that word; and based upon the set of definitions not comprising a definition for that word, excluding that word from the set of gender-biased words.

12. The computer system of claim 10, the memory further storing instructions which, when executed by the at least one data processor, result in operations comprising:

for each synonym that is labeled as being in the male-biased class or the female-biased class, parsing the output of the classification engine to determine the probability that the synonym was correctly classified; and selecting at least one synonym that is labeled as being in the male-biased class or the female-biased class, based upon the probability that that synonym was correctly classified.

13. The computer system of claim 12, wherein the at least one synonym that is labeled as being in the male-biased class or the female-biased class is selected based upon the probability being less than a second threshold.

14. The computer system of claim 13, wherein the first and second thresholds are different than one another.

15. The computer system of claim 14, wherein at least one synonym that is labeled as being in the male-biased class or the female-biased class is selected based upon the probability of that synonym being lower than the probability of another synonym.

16. The computer system of claim 10, the memory further storing instructions which, when executed by the at least one data processor, result in operations comprising filtering out, by the dictionary engine of the computer system, any words from the set of gender-biased words that are stop words, include punctuations other than a dash, or include a number.

17. The computer system of claim 10, the memory further storing instructions which, when executed by the at least one data processor, result in operations comprising deleting the dictionary entry based upon the part of speech being noun.

18. The computer system of claim 10, the memory further storing instructions which, when executed by the at least one data processor, result in operations comprising:

receiving, in a first graphical user interface (GUI) forming part of an end-user layer of the computer system, first user input comprising free-form text;

respectively classifying, by the classification engine of the computer system incorporating the machine learning model, words of the free-form text into the male-biased class, the female-biased class, or the neutral class, at least one of the words of the free-form text being classified into the male-biased class or the female-biased class;

displaying, in the first GUI, the replacement word for at least one of the words classified into the male-biased class or the female-biased class;

receiving, in the first GUI, second user input revising the free-form text by selecting the displayed replacement word; and posting, by the computer system, the revised free-form text to a web site for display in a second GUI forming part of the end-user layer of the computer system.

19. A non-transitory computer-readable medium storing instructions which, when executed by at least one data processor of a computer system, result in operations comprising:

respectively classifying, by a classification engine of the computer system incorporating a machine learning model, words of a corpus into a male-biased class, a female-biased class, or a neutral class, the classification engine outputting each classified word, a label indicating the class into which the word is classified, and a probability that the word was correctly classified;

generating, by a dictionary engine of the computer system, a set of gender-biased words by selecting words that are labeled as being in the male-biased class or the female-biased class, for which the probability exceeds a first threshold, and that are defined within a set of definitions;

for each word of the filtered set of gender-biased words, by the dictionary engine of the computer system:

parsing the set of definitions to extract the most frequent meaning of that word in a part of speech;

parsing the set of definitions to extract a synonym for the extracted most frequent meaning of that word in that part of speech;

parsing the output of the classification engine to determine the label indicating the class into which that synonym was labeled;

selecting at least one synonym that is labeled as being in the neutral class as a replacement for the word of the filtered set of gender-biased words; and outputting a dictionary entry comprising the word, the part of speech, and the selected at least one synonym for that word.

20. The computer-readable medium of claim 19, further storing instructions which, when executed by the at least one data processor, result in operations comprising:

for each synonym that is labeled as being in the male-biased class or the female-biased class, parsing the output of the classification engine to determine the probability that the synonym was correctly classified; and selecting at least one synonym that is labeled as being in the male-biased class or the female-biased class, based upon the probability that that synonym was correctly classified.

* * * * *